United States Patent
Sugaya et al.

(10) Patent No.: US 12,152,189 B2
(45) Date of Patent: Nov. 26, 2024

(54) SURFACTANT COMPOSITION FOR FOAMING SAND

(71) Applicants: NOF CORPORATION, Tokyo (JP); TOYOTA JIDOSHA KABUSHIKI KAISHA, Toyota (JP)

(72) Inventors: Norihiro Sugaya, Amagasaki (JP); Hiroyuki Komiya, Amagasaki (JP); Munehiro Yamada, Amagasaki (JP); Hirotsune Watanabe, Miyoshi (JP); Shogo Izumi, Toyota (JP)

(73) Assignees: NOF CORPORATION, Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 443 days.

(21) Appl. No.: 17/615,385

(22) PCT Filed: Jun. 4, 2020

(86) PCT No.: PCT/JP2020/022084
§ 371 (c)(1),
(2) Date: Nov. 30, 2021

(87) PCT Pub. No.: WO2020/246538
PCT Pub. Date: Dec. 10, 2020

(65) Prior Publication Data
US 2022/0228067 A1    Jul. 21, 2022

(30) Foreign Application Priority Data
Jun. 7, 2019 (JP) .................... 2019-106698

(51) Int. Cl.
*B22C 1/10* (2006.01)
*C09K 23/00* (2022.01)
*C09K 23/04* (2022.01)
*C09K 23/08* (2022.01)
*C09K 23/18* (2022.01)

(52) U.S. Cl.
CPC .............. *C09K 23/018* (2022.01); *B22C 1/10* (2013.01); *C09K 23/04* (2022.01); *C09K 23/08* (2022.01); *C09K 23/18* (2022.01)

(58) Field of Classification Search
CPC .... B22C 1/02; B22C 1/10; B22C 1/18; B22C 1/188; C09K 23/018

USPC .......................... 164/349; 106/38.2
See application file for complete search history.

(56) References Cited

U.S. PATENT DOCUMENTS 7,500,840 B2    3/2009  Zenpo et al.

FOREIGN PATENT DOCUMENTS

| GB | 2 107 327 A | 4/1983 |
| JP | 63-115649 A | 5/1988 |
| JP | 2001-314939 A | 11/2001 |
| WO | 2005/089984 A1 | 9/2005 |

OTHER PUBLICATIONS

Communication issued Aug. 23, 2023 by European Patent Office in European Application No. 20819378.9.
Extended European Search Report issued Jun. 20, 2022 by European Patent Office in European Application No. 20819378.9.
Reporting letter of First Office Action dated Mar. 14, 2023 in Chinese Application No. 202080039493.3.
Office Action issued Feb. 23, 2023 in Chinese Application No. 202080039493.3.
International Search Report for PCT/JP2020/022084 dated, Aug. 18, 2020 (PCT/ISA/210).
International Preliminary Report on Patentability with Translation of the Written Opinion dated Dec. 7, 2021 in International Application No. PCT/JP2020/022084.

*Primary Examiner* — Kevin P Kerns
(74) *Attorney, Agent, or Firm* — Sughrue Mion, PLLC

(57) ABSTRACT

A surfactant composition for a foamed sand including 80 to 99.8 mass % of a compound (A) represented by formula (1); 0.1 to 10 mass % of a compound (B) represented by formula (2); and 0.1 to 10 mass % of an amphoteric surfactant (C):

$$R^1O\text{-}(EO)_n\text{—}SO_3M^1 \qquad (1)$$

wherein $R^1$ represents a hydrocarbon group having 6 to 22 carbons, EO represents oxyethylene group, n is 1 to 10, and $M^1$ represents an alkali metal, an alkaline earth metal, ammonium or an organic ammonium;

$$R^2O\text{—}SO_3M^2 \qquad (2)$$

wherein $R^2$ represents a hydrocarbon group having 6 to 22 carbons, and $M^2$ represents an alkali metal, an alkaline earth metal, ammonium or an organic ammonium.

1 Claim, 2 Drawing Sheets

SURFACTANT COMPOSITION FOR FOAMING SAND

CROSS REFERENCE TO RELATED APPLICATIONS

This application is a National Stage of International Application No. PCT/JP2020/022084 filed Jun. 4, 2020, claiming priority based on Japanese Patent Application No. 2019-106698, filed Jun. 7, 2019

TECHNICAL FIELD

The present invention is related to a surfactants composition for foamed sand which is excellent in rapid-foaming property of the foamed sand and capable of improving the strength of a mold in producing the mold such as a sand core or the like including the foamed sand.

BACKGROUND ARTS

Patent document 1 is known as a prior technique relating to a cast molding apparatus. According to patent document 1, it is disclosed a cast molding apparatus of casting a mold, and a metal mold apparatus used therefor, by agitating a particulate bone material, water-soluble binder and water to obtain foamed mixture and by filling the foamed mixture under pressure into a cavity of a heated metal mold. It is thereby possible to utilize the foamed mixture effectively to provide a cast molding apparatus capable of sufficiently assuring the filling of flowing sand into the metal mold cavity and to provide the apparatus capable of considerably shortening the hardening time of the foamed mixture.

PRIOR TECHNICAL DOCUMENTS

Patent Documents (Patent document 1) WO 2005/089984 A1

SUMMARY OF THE INVENTION

Objects to be Solved by the Invention

According to the method described in patent document 1, as it is required that the water-soluble binder has foaming property as well as essential binding performance for improving the foaming and flowing state of the foamed mixture, a surfactant composition is added thereto. It is demanded, as the surfactant, the surfactant composition for foamed sand excellent in rapid-foaming property of the foamed sand and of improving the strength of a mold.

An object of the present invention is, when a mold such as a sand core or the like including foamed sand is produced, to provide a surfactant composition for the foamed sand having excellent rapid-foaming property and capable of improving the strength of the mold.

Solution for the Object

As the inventors extensively researched for solving the above objects, it is found that a surfactant composition for foamed sand has excellent rapid-foaming property of the foamed sand and the effect of improving the strength of the mold, in the case that the composition contains specific amounts of a specific sulfate ester salt of polyoxyethylene alkyl ether, of a specific alkyl sulfate ester salt and a specific amphoteric surfactant, and the present invention is completed.

That is, the present invention provides a surfactant composition for a foamed sand, the surfactant composition comprising:
80 to 99.8 mass % of a compound (A) represented by the following formula (1);
0.1 to 10 mass % of a compound (B) represented by the following formula (B); and
0.1 to 10 mass % of an amphoteric surfactant (C).

$$R^1O\text{-}(EO)_n\text{—}SO_3M^1 \quad (1)$$

wherein in the formula (1),
$R^1$ represents a hydrocarbon group having 6 to 22 carbons,
EO represents oxyethylene group,
n represents an average molar number added of said oxyethylene group, wherein n is a number from 1 to 10, and
$M^1$ represents an alkali metal, an alkaline earth metal, ammonium or an organic ammonium;

$$R^2O\text{—}SO_3M^2 \quad (2)$$

wherein in the formula (2),
$R^2$ represents a hydrocarbon group having 6 to 22 carbons, and
$M^2$ represents an alkali metal, an alkaline earth metal, ammonium or organic ammonium.

Effects of the Invention

According to the surfactant composition for the foamed sand of the present invention, the binder, sand, surfactant composition, water etc. can be sufficiently foamed only by kneading for a short time, and a mold with a high strength can be produced.

MODES FOR CARRYING OUT THE INVENTION

Figure 1:
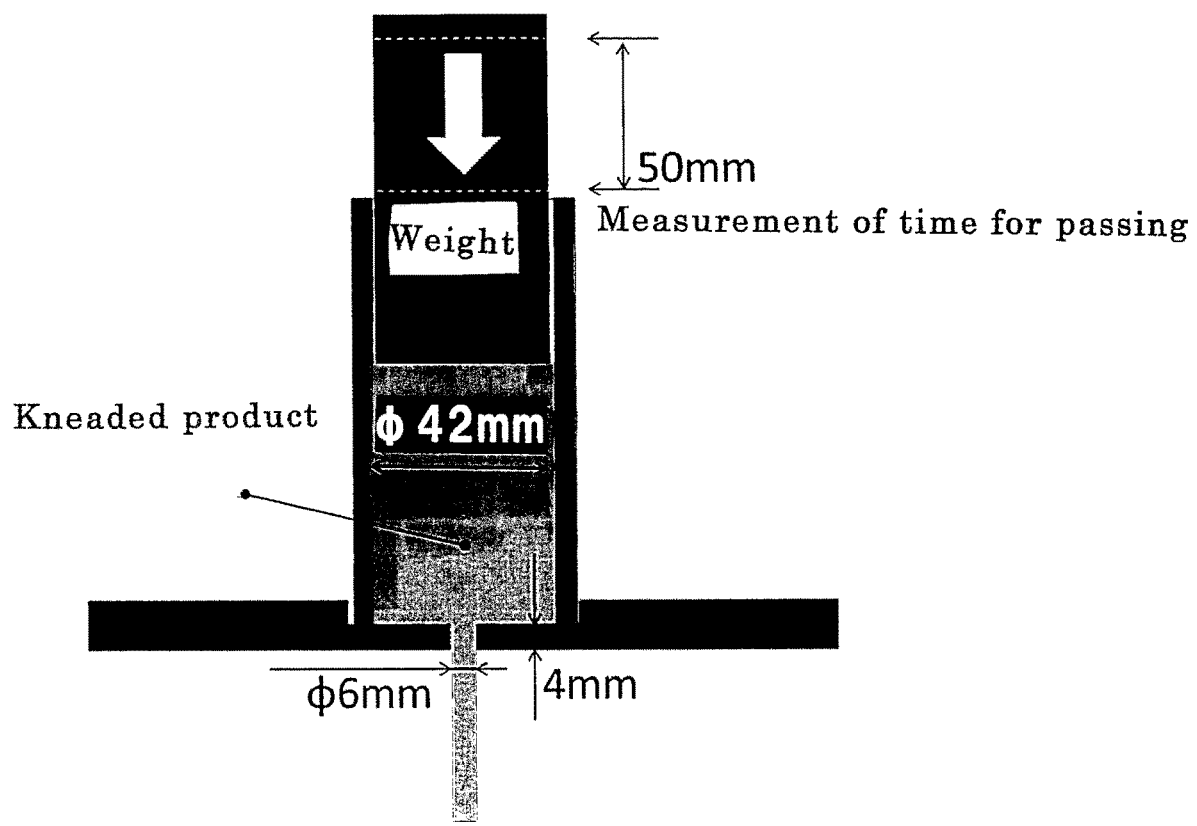
FIG. 1 is a diagram schematically showing a method of measuring a kinematic viscosity.

The surfactant composition for the foamed sand of the present invention contains the component (A), component (B) and component (C). Further, the total of the respective mass ratios of the component (A), component (B) and component (C) is 100 mass %. The respective components are described below.

Further, the numerical range represented by "1 to 10" includes numerals at the upper and lower limits and means 1 or higher and 10 or lower.

(Component (A))

The component (A) used in the present invention is the polyoxyethylene alkyl ether sulfate ester salt of the following formula (1).

$$R^1O\text{-}(EO)_n\text{—}SO_3M^1 \quad (1)$$

In the polyoxyethylene alkyl ether sulfate ester salt represented by the formula (1), $R^1$ represents a hydrocarbon group having 6 to 22 carbons, and may preferably be a hydrocarbon group having 6 to 20 carbons. The hydrocarbon group may be a saturated hydrocarbon group or a hydrocarbon group having a carbon-carbon double bond (particularly preferably alkenyl group). In the case that the hydrocarbon group is the unsaturated hydrocarbon group having the carbon-carbon double bond, the number of the double bonds may preferably be 3 or lower and more preferably be 2 or lower. For example, such hydrocarbon group may be caprylic group, lauryl group, myristyl group, palmityl group, stearyl group, oleyl group, behenyl group or the like. Further, hydrocarbon groups derived from mixed fatty acids containing two or more kinds of hydrocarbon groups may be used and, for example, hydrocarbon groups of coconut oil or hydrocarbon groups of palm kernel oil may be used. Among them, lauryl group, myristyl group, hydrocarbon groups of coconut oil and hydrocarbon groups of palm kernel oil are preferred, and myristyl group is more preferably contained.

In the formula (1), n represents an average molar number added of the oxyethylene group, and n is 1 to 10, preferably 2 to 6 and more preferably 3 to 4.

In the formula (1), $M^1$ represents an alkali metal, an alkaline earth metal, ammonium or an organic ammonium. The alkali metal may be lithium, sodium, potassium or the like, and preferably sodium. The alkaline earth metal may be calcium, strontium, barium or the like, and preferably calcium. Ammonium is represented by $NH_4^+$.

The organic ammonium may be, for example, an alkanol ammonium derived from an alkanol amine such as monoethanol amine, diethanol amine, triethanol amine or the like, and an alkyl ammonium derived from an alkyl amine such as diethyl amine, triethyl amine or the like. According to the present invention, one kind or two kinds or more of the components (A) may be appropriately selected and utilized.

Further, the content of the component (A) is 80 to 99.8 mass %, provided that 100 mass % is assigned to a total amount of the component (A), component (B) and component (C). As the strength of the mold is reduced in the case that the content of the component (A) is lower than 80 mass %, the content is thus made 80 mass % or higher, preferably 85 mass % or higher and more preferably 90 mass % or higher. Further, as the rapid-foaming property is deteriorated in the case that the content of the component (A) exceeds 99.8 mass %, the content is made 99.8 mass % or lower, is preferably 97 mass % or lower and more preferably 95% or lower.

((Component (B))

The component (B) applied in the present invention is the alkyl sulfate ester salt represented by the following formula (2).

$$R^2O\text{---}SO_3M^2 \quad (2)$$

In the alkyl sulfate ester salt represented by the formula (2), $R^2$ represents a hydrocarbon group having 6 to 22 carbons, and preferably a hydrocarbon group having 6 to 20 carbons. The hydrocarbon group may be a saturated hydrocarbon group, or a hydrocarbon group (particularly preferably alkenyl group) having an unsaturated bond including a carbon-carbon double bond. In the case that the hydrocarbon group is the unsaturated hydrocarbon group having the carbon-carbon double bond, the number of the double bonds may preferably be 3 or lower and more preferably be 2 or lower. For example, such hydrocarbon group may be caprylic group, lauryl group, myristyl group, palmityl group, stearyl group, oleyl group, behenyl group or the like. Further, hydrocarbon groups derived from mixed fatty acids containing two or more kinds of hydrocarbon groups may be used and, for example, hydrocarbon groups of coconut oil or hydrocarbon groups of palm kernel oil may be used. Among them, hydrocarbon groups of coconut oil and hydrocarbon groups of palm kernel oil are preferred.

In the formula (2), $M^2$ is an alkali metal, an alkaline earth metal, ammonium or an organic ammonium. The alkali metal may be lithium, sodium, potassium or the like, and preferably sodium. The alkaline earth metal may be calcium, strontium, barium or the like, and preferably calcium. The organic ammonium may be, for example, an alkanol ammonium derived from an alkanol amine such as monoethanol amine, diethanol amine, triethanol amine or the like, and an alkyl ammonium derived from an alkyl amine such as diethyl amine, triethyl amine or the like. According to the present invention, one kind or two kinds or more of the components (B) may be appropriately selected and utilized.

The content of the component (B) is 0.1 to 10 mass %, provided that 100 mass % is assigned to a total of the contents of the component (A), component (B) and component (C). As the rapid-foaming property is deteriorated in the case that the content of the component (B) is below 0.1 mass %, the content is made 0.1 mass % or higher and more preferably is 0.5 mass % or higher. Further, as the strength of the mold may possibly be deteriorated in the case that the content of the component (B) exceeds 10 mass %, the content is made 10 mass %, is preferably 7 mass % or lower and more preferably 5 mass % or lower.

((C) Component)

The component (C) applied in the present invention is an amphoteric surfactant and, for example, may be a surfactant having the structure including N-acyl group or N-alkyl group, a cationic group and an anionic group. For example, specifically, the component (C) may be alkyl betaine, alkyl amide betaine, alkyl hydroxysulfo betaine, alkyl amide hydroxysulfo betaine, alkyl carboxy methyl hydroxy ethyl imidazolinium betaine, alkyl amide hydroxyethyl amino acid-type amphoteric surfactant, alkyl iminodiacetate salt or the like.

The acyl group contained in the amphoteric surfactant described above may be, for example, a residual group of a straight chain or branched chain fatty acid having 6 to 22 carbons. The fatty acid of the fatty acid residual group may be, for example, saturated fatty acids such as caproic acid, caprylic acid, capric acid, lauric acid, myristic acid, palmitic acid, stearic acid, isostearic acid, arachidic acid, behenic acid or the like, unsaturated fatty acids such as palmitoleic acid, oleic acid, elaidic acid, linoleic acid, linolenic acid or the like, and palm oil fatty acid, palm kernel oil fatty acid, beef tallow fatty acid, hardened beef tallow fatty acid or the like which are the mixture thereof. Among them, lauric acid, palm oil fatty acid and palm kernel oil fatty acid are preferred. Lauric acid is particularly preferred.

The alkyl group contained in the amphoteric surfactant described above may be, for example, a hydrocarbon group having 6 to 22 carbons, including alkyl groups derived from mixed fatty acids. For example, alkyl groups such as caproyl group, caprilyl group, caprylic group, lauryl group, myristyl group, palmityl group, stearyl group, oleyl group or the like, and mixed alkyl groups such as palm oil alkyl groups, palm kernel oil alkyl groups, beef tallow alkyl groups or the like are listed. Among them, lauric group, palm oil alkyl groups and palm kernel oil alkyl groups are preferred. Lauryl group is particularly preferred.

Specific examples of the amphoteric surfactants of the component (C) include, for example, lauryl betaine, coconut oil fatty acid amide propyl betaine, palm kernel oil fatty acid amide propyl betaine, lauryl dimethyl amino acetic acid betaine, lauryl hydroxysulfo betaine or the like.

According to the present invention, one kind or two or more kinds of the component (C) may be appropriately selected and applied.

The content of the component (C) is 0.1 to 10 mass %, provided that 100 mass % is assigned to a total of the contents of the component (A), component (B) and component (C). As the strength of the mold is deteriorated in the case that the content of the component (C) is below 0.1 mass %, the content is made 0.1 mass % or higher, is preferably 3 mass % or higher and more preferably be 5 mass % or higher. Further, as the rapid-foaming property is deteriorated in the case that the content of the component (C) exceeds 10 mass %, the content is made 10 mass % or lower.

The surfactant composition for foamed sand of the present invention may contain an additive in addition to the components described above, as far as the effects of the present invention is not inhibited. For example, organic or inorganic salts, pH adjusting agents, fungicides, chelating agents, pigments, perfumes or the like are listed.

EXAMPLES

Inventive Examples 1 to 8 and Comparative Examples 1 to 9

The present invention will be specifically described below, referring to the inventive examples and comparative examples.

The respective raw materials of the inventive examples 1 to 8 and comparative examples 1 to 9 shown in tables 4 and 5 were charged into a beaker, and then agitated at 50 l for 1 hour by means of a magnetic stirrer to prepare the surfactant compositions for foamed sand. The blend ratios in the tables are in the term of mass %, and "-" represents 0 mass %.

Further, the symbols etc. in the formula (1) of the respective components A1 to A4 shown in tables 4 and 5 are described in table 1, the symbols etc. in the formula (2) of components B1 and B2 shown in tables 4 and 5 are described in table 2, and the physical properties of the respective components C1 to C4 shown in tables 4 and 5 are described in table 3. Further, the specific contents of the respective components are as follows.

A1: "PERSOFT EF" (manufactured by NOF Corporation)
A2: "Trucks K-40" (manufactured by NOF Corporation)
A3: "PERSOFT EDO" (manufactured by NOF Corporation)
A4: "PERSOFT EL" (manufactured by NOF Corporation)
B1: "PERSOFT SK" (manufactured by NOF Corporation)
B2: "PERSOFT SP" (manufactured by NOF Corporation)
C1: "Nissan Anon BDL-SF" (manufactured by NOF Corporation)
C2: "Nissan Anon BDC-SF" (manufactured by NOF Corporation)
C3: "Nissan Anon BDF-SF" (manufactured by NOF Corporation)
C4: "Nissan Anon BL-SF" (manufactured by NOF Corporation)

The following tests were performed for the thus obtained respective surfactant compositions for foamed sand. The evaluations of "⊚" and "○" were categorized as "passed" in each of the tests.

(1) Rapid-Foaming Property

Procedure 1

Artificial sand is prepared as articulate bone material, water glass and the surfactant for the evaluation are prepared as water soluble binders, and water is prepared. The materials were charged into a kneading system in weight ratios of 100 of the artificial sand, 0.5 to 2.5 of the solid content of the water glass, 0.01 to 0.05 of the effective ingredient of the surfactant and 2 to 4 of water.

Procedure 2

The materials described above are kneaded by means of the kneading system for 120 seconds to obtain foamed mixture.

Procedure 3

The foamed and kneaded product is charged into an apparatus for measuring kinetic viscosity as shown in FIG. 1.

Procedure 4

As shown in FIG. 1, a weight of 1 kg is mounted on the foamed and kneaded product, and a kinetic viscosity is measured as a time for the weight to pass each of standard lines at an interval of 50 mm while the foamed and kneaded product is discharged through a hole at lower side having φ of 6 mm and the weight is moved downwardly.

The rapid-foaming property is evaluated according to the following evaluation standard.

○: Measured time is shorter than 2.00 seconds.

Δ: Measured time is 2.00 seconds or longer and shorter than 2.20 seconds.

x: Measured time is 2.20 seconds or longer.

(2) Strength of Mold

The flexural strength of the mold containing the foamed sand is measured.

Procedure 1

Artificial sand is prepared as articulate bone material, water glass and the surfactant for the evaluation are prepared as water soluble binders, and water is prepared. The materials are charged into a kneading system in weight ratios of 100 of the artificial sand, 0.5 to 2.5 of the solid content of the water glass, 0.01 to 0.05 of the effective ingredient of the surfactant and 2 to 4 of water.

Procedure 2

The materials were kneaded by means of the kneading system for 300 seconds to obtain foamed mixture.

Procedure 3

The foamed mixture produced as described above is charged into a metal mold for molding by means of a system for molding a test piece for measuring the strength.

The test piece for molding (10 mm×30 mm×85 mm) is sintered in a molding metal mold at 200 to 300° C. for 30 to 120 seconds and thus molded.

Procedure 4

The thus molded and drawn test piece of the mold is cooled to room temperature.

Procedure 5

Figure 2:
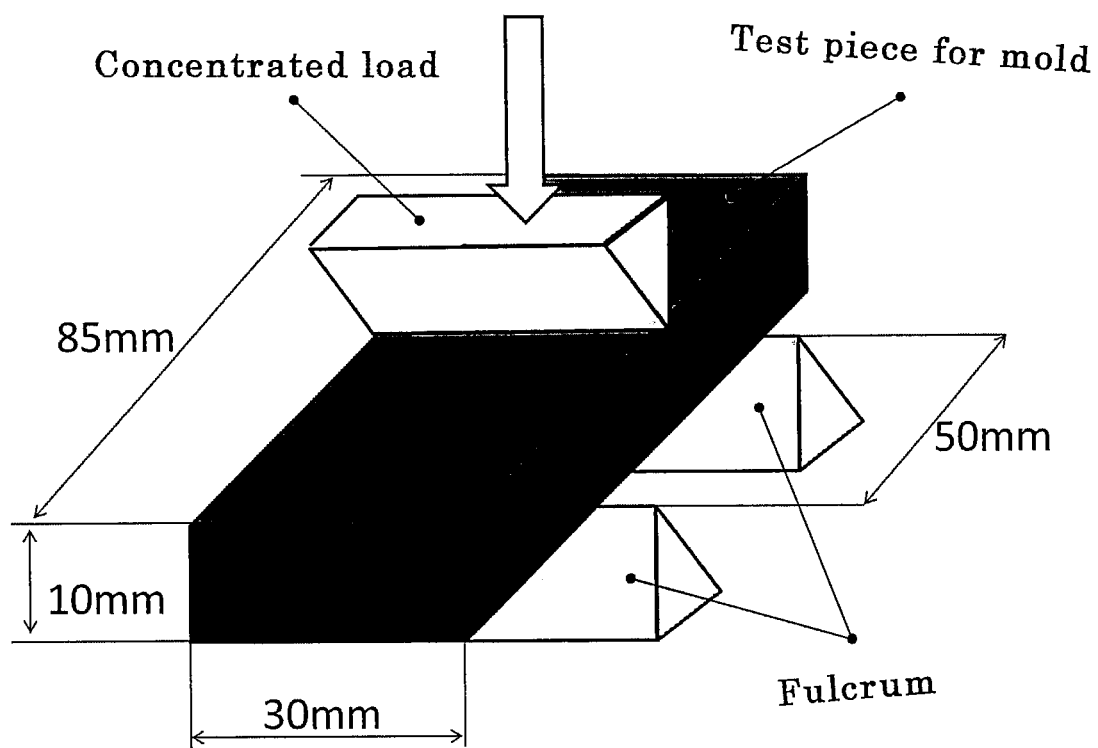
FIG. 2 is a diagram schematically showing the state that a test piece is set in a machine for testing a flexural strength for a mold and that the flexural strength of the test piece is measured.

As shown in FIG. 2, the test piece is set in the apparatus for testing the flexural strength for mold and the flexural strength of the test piece is measured to obtain the strength of the mold. The unit of the strength of the mold is kg/cm².

The strength of the mold is evaluated according to the following evaluation standard.

⊚: The strength of the mold is 31 or larger.

○: The strength of the mold is 30.5 or larger and below 31.

Δ: The strength of the mold is 30 or larger and below 30.5 x: The strength of mold is below 30

TABLE 1

| | $R^1$ | Number of carbons of $R^1$ | n | $M^1$ |
|---|---|---|---|---|
| A1 | Lauryl group and myristyl group (68:32) ※1 | 12, 14 | 3 | Sodium |
| A2 | Lauryl group | 12 | 4 | Sodium |
| A3 | Lauryl group and tridecyl group (42:58) ※1 | 12, 13 | 3 | Sodium |
| A4 | Palm oil alkyl group ※2 | 6 to 20 | 3 | Sodium |

※1 Numerals in parenthesis indicates the mass ratios of components having the respective alkyl groups.
※2 As to the information of composition, please refer to "Standard Tables of Food Composition in Japan, the year 2015 version (Seventh edition), Edition of Tables of fatty acid compositions, Chapter 2, Table 2, Tables of fatty acid compositions per 100 g of total amount of fatty acids (Tables of fatty acid compositions), 14, oils and fats"

TABLE 2

|   | $R^2$ | Number of carbons of $R^1$ | $M^2$ |
|---|---|---|---|
| B1 | Palm oil alkyl group ※1 | 6 to 20 | Sodium |
| B2 | Lauryl group | 12 | Sodium |

※1 As to ths information of composition, please refer to "Standard Tables of Food Composition in Japan, the year 2015 version (Seventh edition), Edition of Tables of fatty acid compositions, Chapter 2, Table 2, Tables of fatty acid compositions per 100 g of total amount of fatty acids (Tables of fatty acid compositions), 14, oils and fats"

TABLE 3

|   | Names of components | Number of carbons of alkyl group |
|---|---|---|
| C1 | Lauric acid amide propyl dimethyl amino acetic acid betaine | 12 |
| C2 | Palm kernel oil fatty acid amide propyl dimethyl amino acetic acid betaine ※1 | 6~20 |
| C3 | Coconut oil fatty acid amide propyl dimethyl amino acetic acid betaine ※1 | 6~20 |
| C4 | Lauryl dimethyl amino acetic acid betaine | 12 |

※1 As to the information of composition, please refer to "Standard Tables of Food Composition in Japan, the year 2015 version (Seventh edition), Edition of Tables of fatty acid compositions, Chapter 2, Table 2, Tables of fatty acid compositions per 100 g of total amount of fatty acids (Tables of fatty acid compositions), 14, oils and fats"

TABLE 4

|  |  | Inventive Examples | | | | | | | |
|---|---|---|---|---|---|---|---|---|---|
|  |  | 1 | 2 | 3 | 4 | 5 | 6 | 7 | 8 |
| Component (A) (mass %) | A1 | 90 | 94.5 | 85 | 94.5 | 85 | 90 | 90 | 90 |
| Component (B) (mass %) | B1 | 5 | 5 | 5 | 0.5 | 10 | 5 | 5 | 5 |
| Component (C) (mass %) | C1 | 5 | 0.5 | 10 | 5 | 5 | — | — | — |
|  | C2 | — | — | — | — | — | 5 | — | — |
|  | C3 | — | — | — | — | — | — | 5 | — |
|  | C4 | — | — | — | — | — | — | — | 5 |
| Evaluation results | (1)Rapid-foaming property kneaded for 120 seconds | ○ (1.95) | ○ (1.97) | ○ (1.96) | ○ (1.99) | ○ (1.91) | ○ (1.96) | ○ (1.98) | ○ (1.96) |
|  | (2)Strength of mold | ◎ (32.5) | ○ (30.5) | ◎ (33.5) | ◎ (33.1) | ○ (30.9) | ○ (30.7) | ○ (30.7) | ○ (30.5) |

TABLE 5

|  |  | Comparative Examples | | | | | | | | |
|---|---|---|---|---|---|---|---|---|---|---|
|  |  | 1 | 2 | 3 | 4 | 5 | 6 | 7 | 8 | 9 |
| Component (A) (mass %) | A1 | 100 | — | — | — | — | — | 80 | 80 | 95 |
|  | A2 | — | — | 100 | — | — | — | — | — | — |
|  | A3 | — | — | — | 100 | — | — | — | — | — |
|  | A4 | — | — | — | — | 100 | — | — | — | — |
| Component (B) (mass %) | B1 | — | 100 | — | — | — | — | 5 | 15 | 5 |
|  | B2 | — | — | — | — | — | 99.2 | — | — | — |
| Component (C) (mass %) | C1 | — | — | — | — | — | 0.8 | 15 | 5 | — |
| Evaluation results | (1) Rapid-foaming property kneaded for 120 seconds | X (2.28) | ○ (1.97) | X (3.53) | X (2.55) | X (3.04) | ○ (1.53) | X (2.25) | ◎ (1.93) | X (2.23) |
|  | (2)Strength of mold | X (29.0) | X (25.8) | ○ (30.8) | X (29.7) | ◎ (33.3) | X (29.2) | ◎ (32.1) | X (29.7) | X (27.0) |

According to the surfactant compositions for foamed sand of the inventive examples 1 to 8 of the present invention, as the component (A), component (B) and component (C) are contained in specific ratios, the rapid-foaming property of the foamed sand was excellent and the strength of the mold was good.

On the other hand, according to the comparative example 1, as the component (B) and component (C) were not contained, the rapid-foaming property and strength of the mold were deteriorated.

According to the comparative example 2, as the component (A) and component (C) were not contained, the strength of the mold was lowered.

According to the comparative example 3, as the component (B) and component (C) were not contained, the rapid-foaming property was deteriorated.

According to the comparative example 4, as the component (B) and component (C) were not contained, the rapid-foaming property and strength of the mold were deteriorated.

According to the comparative example 5, as the component (B) and component (C) were not contained, the rapid-foaming property was deteriorated.

According to the comparative example 6, as the component (A) was not contained, the strength of the mold was lowered.

According to the comparative example 7, as the content of the component (C) exceeded the upper limit of the defined range of the claim, the rapid-foaming property was deteriorated.

According to the comparative example 8, as the content of the component (B) exceeds the upper limit of the defined range of the claim, the strength of the mold was lowered.

According to the comparative example 9, as the component (C) was not contained, the strength of the mold was lowered.

The invention claimed is:

1. A surfactant composition for a foamed sand, said surfactant composition comprising:

80 to 99.8 mass % of a compound (A) represented by the following formula (1);

0.1 to 10 mass % of a compound (B) represented by the following formula (2); and 0.1 to 10 mass % of an amphoteric surfactant (C):

$$R^1O\text{-}(EO)_n\text{---}SO_3M^1 \qquad (1)$$

wherein in the formula (1), $R^1$ represents a hydrocarbon group having 6 to 22 carbons, EO represents oxyethylene group, n represents an average molar number added of said oxyethylene group, wherein n is a number from 1 to 10, and $M^1$ represents an alkali metal, an alkaline earth metal, ammonium, or an organic ammonium;

$$R^2O\text{---}SO_3M^2 \qquad (2)$$

wherein in the formula (2), $R^2$ represents a hydrocarbon group having 6 to 22 carbons, and $M^2$ represents an alkali metal, an alkaline earth metal, ammonium, or an organic ammonium.

* * * * *